United States Patent
Tabares et al.

(10) Patent No.: US 11,429,566 B2
(45) Date of Patent: Aug. 30, 2022

(54) APPROACH FOR A CONTROLLABLE TRADE-OFF BETWEEN COST AND AVAILABILITY OF INDEXED DATA IN A CLOUD LOG AGGREGATION SOLUTION SUCH AS SPLUNK OR SUMO

(71) Applicant: Citrix Systems, Inc., Fort Lauderdale, FL (US)

(72) Inventors: Modesto Tabares, Weston, FL (US); Juan Rivera, Doral, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 287 days.

(21) Appl. No.: 16/193,388

(22) Filed: Nov. 16, 2018

(65) Prior Publication Data
US 2020/0159841 A1    May 21, 2020

(51) Int. Cl.
G06F 17/00    (2019.01)
G06F 7/00    (2006.01)
G06F 16/18    (2019.01)
G06N 20/00    (2019.01)

(52) U.S. Cl.
CPC ......... G06F 16/1805 (2019.01); G06N 20/00 (2019.01)

(58) Field of Classification Search
CPC ............................ G06F 16/1805; G06N 20/00
USPC ........................................................ 707/722
See application file for complete search history.

(56) References Cited

U.S. PATENT DOCUMENTS

| | | | | |
|---|---|---|---|---|
| 8,498,995 | B1 * | 7/2013 | Gond | G06F 16/245 707/754 |
| 9,262,427 | B2 * | 2/2016 | Koifman | G06F 3/0623 |
| 9,773,034 | B1 * | 9/2017 | Smith | G06F 16/2228 |
| 10,114,666 | B1 * | 10/2018 | Joyce | H04L 67/141 |
| 11,080,336 | B2 * | 8/2021 | Van Dusen | G06Q 50/01 |
| 2012/0000542 | A1 | 1/2012 | Eto et al. | |
| 2012/0005542 | A1 * | 1/2012 | Petersen | G06F 21/552 714/48 |

(Continued)

FOREIGN PATENT DOCUMENTS

CN    105515836 A    4/2016

OTHER PUBLICATIONS

International Search Report and Written Opinion for International Appl. No. PCT/US2019/061642, dated Dec. 27, 2020.

(Continued)

*Primary Examiner* — Pavan Mamillapalli
(74) *Attorney, Agent, or Firm* — Foley & Lardner LLP

(57) ABSTRACT

Systems and methods for classification of log data at the source into sets of critical and non-critical data. Critical data may be indexed and processed normally, while non-critical data may be provided to and stored by the cloud-based log aggregation system without indexing, at significantly lower cost in terms of processing and storage. In the event that non-critical data is required for troubleshooting or analysis, the non-critical data may be indexed dynamically on request. Because the non-critical data is stored at the cloud-based log aggregation system, it may be quickly indexed and added to the critical data, without additional consumption of bandwidth or delays due to transmission. Dynamic selection and classification of critical and non-critical data may thus allow an enterprise to balance costs and availability of indexed data.

20 Claims, 6 Drawing Sheets

(56) References Cited

U.S. PATENT DOCUMENTS

| | | | |
|---|---|---|---|
| 2014/0280197 A1 | 9/2014 | Gatto et al. | |
| 2015/0213065 A1* | 7/2015 | Sisk | G06Q 10/10 707/692 |
| 2016/0292592 A1* | 10/2016 | Patthak | G06F 16/2455 |
| 2017/0011079 A1 | 1/2017 | Verma et al. | |
| 2017/0300517 A1 | 10/2017 | Amirsoleymani et al. | |
| 2018/0183821 A1* | 6/2018 | Schneider | G06F 16/285 |

OTHER PUBLICATIONS

International Preliminary Report on Patentability for International Appl. No. PCT/US2019/061642 dated May 27, 2021.

Examination Report on AU Appl. No. 2019379163 dated Feb. 24, 2022.

* cited by examiner

APPROACH FOR A CONTROLLABLE TRADE-OFF BETWEEN COST AND AVAILABILITY OF INDEXED DATA IN A CLOUD LOG AGGREGATION SOLUTION SUCH AS SPLUNK OR SUMO

FIELD OF THE DISCLOSURE

The present application generally relates to management of data indexing in a cloud-based log aggregation solution.

BACKGROUND OF THE DISCLOSURE

Log aggregation systems, such as the cloud-based log aggregation systems Splunk, provided by Splunk Inc. of San Francisco, Calif., and Sumo, provided by Sumo Logic of Redwood City, Calif., allow for aggregation and data analysis of computer-generated log messages (e.g. audit trails, event logs, audit records, etc.). However, these services are typically all-or-nothing; users must send all the log data that may potentially be needed for later analysis. Since it is very difficult to anticipate what data will ever be needed, especially in the context of an emergency outage, enterprises typically send all of the available logging data, including logs generated by user devices, network appliances, servers, Internet-of-Things (IoT) devices, or any other type and form of device. The amount of data may be quite large, resulting in significant expense, as the cloud-based log aggregation systems typically charge fees for processing and indexing the data based on size. Most of the expense of these systems comes from the huge amount of compute and storage requirements for indexing all the data that is ingested. Additionally, large amounts of bandwidth are needed, as well as significant computing resources on the client side in order to collect and provide this data to the cloud-based log aggregation systems. Discarding data may reduce costs, but may result in loss of data required for troubleshooting of systems and software. Similarly, retaining logging data at the client devices for later aggregation in the event of an emergency may result in loss of data in some events, and may incur significant delays when troubleshooting is required due to transmission and processing time.

BRIEF SUMMARY OF THE DISCLOSURE

The system and methods discussed herein provide for classification of data at the source into sets of critical and non-critical data (sometimes referred to as priority and non-priority data, high priority and low priority data, indexed data and archived data, data to be indexed and data not to be indexed or to be archived, or similar terms). Critical data may be indexed and processed normally, while non-critical data may be provided to and stored by the cloud-based log aggregation system without indexing, at significantly lower cost in terms of processing and storage. In the event that non-critical data is required for troubleshooting or analysis, the non-critical data may be indexed dynamically on request. Because the non-critical data is stored at the cloud-based log aggregation system, it may be quickly indexed and added to the critical data, without additional consumption of bandwidth or delays due to transmission. Dynamic selection and classification of critical and non-critical data may thus allow an enterprise to balance costs and availability of indexed data.

In one aspect, the present disclosure is directed to a method for cloud-based log management. The method includes retrieving, by a log manager of a computing device, a plurality of logs. The method also includes selecting, by the log manager, a first subset of the plurality of logs. The method also includes classifying, by the log manager, the first subset of the plurality of logs as critical, high priority, or to be indexed. The method also includes transmitting, by the log manager to a log aggregator for indexing, the first subset of the plurality of logs, responsive to the classification of the first subset of the plurality of logs as critical, high priority, or to be indexed. The method also includes transmitting, by the log manager to a storage device of the log aggregator, a remaining subset of the plurality of logs.

In some implementations, the method includes retrieving the plurality of logs by retrieving, by the log manager from a plurality of additional computing devices, the plurality of logs. In some implementations, the method includes appending, by the log manager, an indexing control identifier to each log of the first subset of the plurality of logs. In a further implementation, the method includes appending the indexing control identifier to metadata of each log of the first subset of the plurality of logs.

In some implementations, the log aggregator stores the remaining subset of the plurality of logs without indexing responsive to the remaining subset of the plurality of logs not being classified as critical, high priority, or to be indexed. In some implementations, the method includes selecting the first subset of the plurality of logs by selecting a log of the plurality of logs, by a machine learning system of the computing device; and adding the log to the first subset, by the machine learning system, responsive to the log having characteristics matching characteristics of logs previously requested for review. In a further implementation, the characteristics comprise routines that generated the logs previously requested for review, computing devices corresponding to the logs previously requested for review, generation times of logs previously requested for review, or types of logs previously requested for review.

In some implementations, the method includes selecting the first subset of the plurality of logs by, for each log of the first subset of the plurality of logs: identifying, by the log manager, a routine that generated the log, the routine comprising an indexing command; and adding the log to the first subset, by the log manager, responsive to the identified routine comprising the indexing command.

In some implementations, the method includes transmitting, by the log manager to the log aggregator, a request to index at least one log of the remaining subset of the plurality of logs, the log aggregator indexing the at least one log of the remaining subset of the plurality of logs responsive to receipt of the request.

In another aspect, the present disclosure is directed to a system for cloud-based log management. The system includes a computing device comprising a network interface and a processor executing a log manager. The log manager is configured to: retrieve a plurality of logs; select a first subset of the plurality of logs; and classify the first subset of the plurality of logs as critical, high priority, or to be indexed. The log manager is also configured to: transmit, to a log aggregator for indexing, the first subset of the plurality of logs, responsive to the classification of the first subset of the plurality of logs as critical, high priority, or to be indexed; and transmit, to a storage device of the log aggregator, a remaining subset of the plurality of logs.

In some implementations, the log manager is further configured to retrieve, from a plurality of additional computing devices, the plurality of logs. In some implementations, the log manager is further configured to append an indexing control identifier to each log of the first subset of the plurality of logs. In a further implementation, the log manager is further configured to append the indexing control identifier to metadata of each log of the first subset of the plurality of logs.

In some implementations, the log aggregator stores the remaining subset of the plurality of logs without indexing responsive to the remaining subset of the plurality of logs not being classified as critical, high priority, or to be indexed. In some implementations, the log manager further comprises a machine learning system configured to: select a log of the plurality of logs; and add the log to the first subset, responsive to the log having characteristics matching characteristics of logs previously requested for review. In a further implementation, the characteristics comprise routines that generated the logs previously requested for review, computing devices corresponding to the logs previously requested for review, generation times of logs previously requested for review, or types of logs previously requested for review.

In some implementations, the log manager is further configured to, for each log of the first subset of the plurality of logs: identify a routine that generated the log, the routine comprising an indexing command; and add the log to the first subset, by the log manager, responsive to the identified routine comprising the indexing command.

In some implementations, the log manager is further configured to transmit, to the log aggregator, a request to index at least one log of the remaining subset of the plurality of logs, the log aggregator indexing the at least one log of the remaining subset of the plurality of logs responsive to receipt of the request.

In still another aspect, the present disclosure is directed to a tangible computer-readable storage medium comprising instructions that, when executed by the processor of a computing device, cause the processor to: retrieve a plurality of logs; select a first subset of the plurality of logs; classify the first subset of the plurality of logs as critical, high priority, or to be indexed; transmit, to a log aggregator for indexing, the first subset of the plurality of logs, responsive to the classification of the first subset of the plurality of logs as critical, high priority, or to be indexed; and transmit, to a storage device of the log aggregator, a remaining subset of the plurality of logs.

In some implementations, the computer readable medium further comprises instructions to append an indexing control identifier to each log of the first subset of the plurality of logs.

The details of various embodiments are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
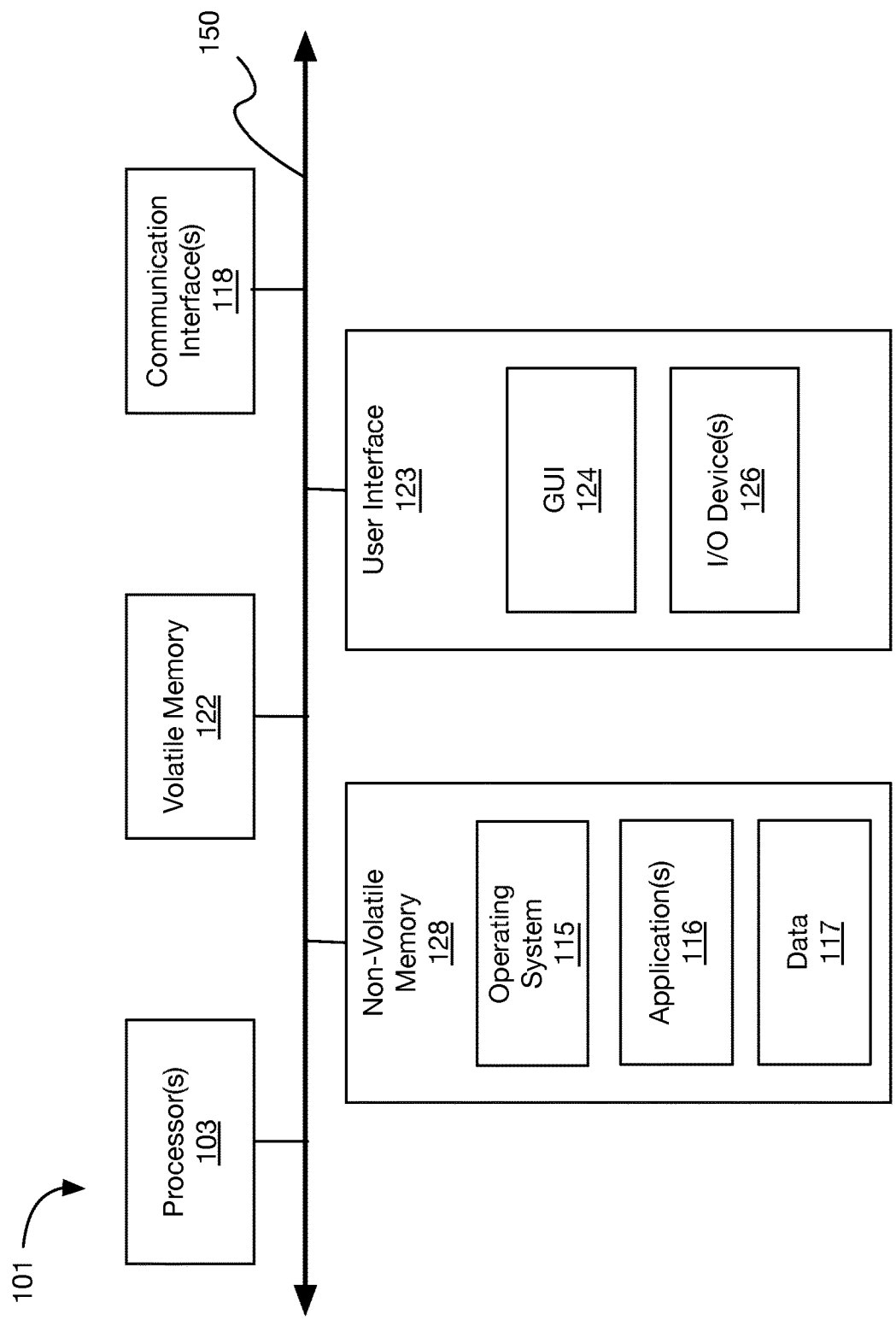
FIG. 1 is a block diagram illustrating an implementation of a computing device for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for cloud-based log management.

A. Computing Environment

Prior to discussing the specifics of embodiments of the systems and methods for cloud-based log management, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O devices(s) 126. Various elements of computer 101 may communicate via one or more communication buses, shown in communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" a be embodied in one or more application specific integrated circuits (ASICs), microprocessors, digital signal processors (DSPs) graphics processing units (GPUs), microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Cloud-Based Log Management

Log aggregation systems, such as the cloud-based log aggregation systems Splunk, provided by Splunk Inc. of San Francisco, Calif., and Sumo, provided by Sumo Logic of Redwood City, Calif., allow for aggregation and data analysis of computer-generated log messages (e.g. audit trails, event logs, audit records, etc.). However, these services are typically all-or-nothing; users must send all the log data that may potentially be needed for later analysis. Since it is very difficult to anticipate what data will ever be needed, especially in the context of an emergency outage, enterprises typically send all of the available logging data, including logs generated by user devices, network appliances, servers, Internet-of-Things (IoT) devices, or any other type and form of device. The amount of data may be quite large, resulting in significant expense, as the cloud-based log aggregation systems typically charge fees for processing and indexing the data based on size. Most of the expense of these systems comes from the huge amount of compute and storage requirements for indexing all the data that is ingested. Additionally, large amounts of bandwidth are needed, as well as significant computing resources on the client side in order to collect and provide this data to the cloud-based log aggregation systems. Discarding data may reduce costs, but may result in loss of data required for troubleshooting of systems and software. Similarly, retaining logging data at the client devices for later aggregation in the event of an emergency may result in loss of data in some events, and may incur significant delays when troubleshooting is required due to transmission and processing time.

To address these and other problems, the system and methods discussed herein provide for classification of data at the source into sets of critical and non-critical data (sometimes referred to as priority and non-priority data, high priority and low priority data, indexed data and archived data, or similar terms). Critical data may be indexed and processed normally, while non-critical data may be provided to and stored by the cloud-based log aggregation system without indexing, at significantly lower cost in terms of processing and storage. In the event that non-critical data is required for troubleshooting or analysis, the non-critical data may be indexed dynamically on request. Because the non-critical data is stored at the cloud-based log aggregation system, it may be quickly indexed and added to the critical data, without additional consumption of bandwidth or delays due to transmission. Dynamic selection and classification of critical and non-critical data may thus allow an enterprise to balance costs and availability of indexed data.

Figure 2A:
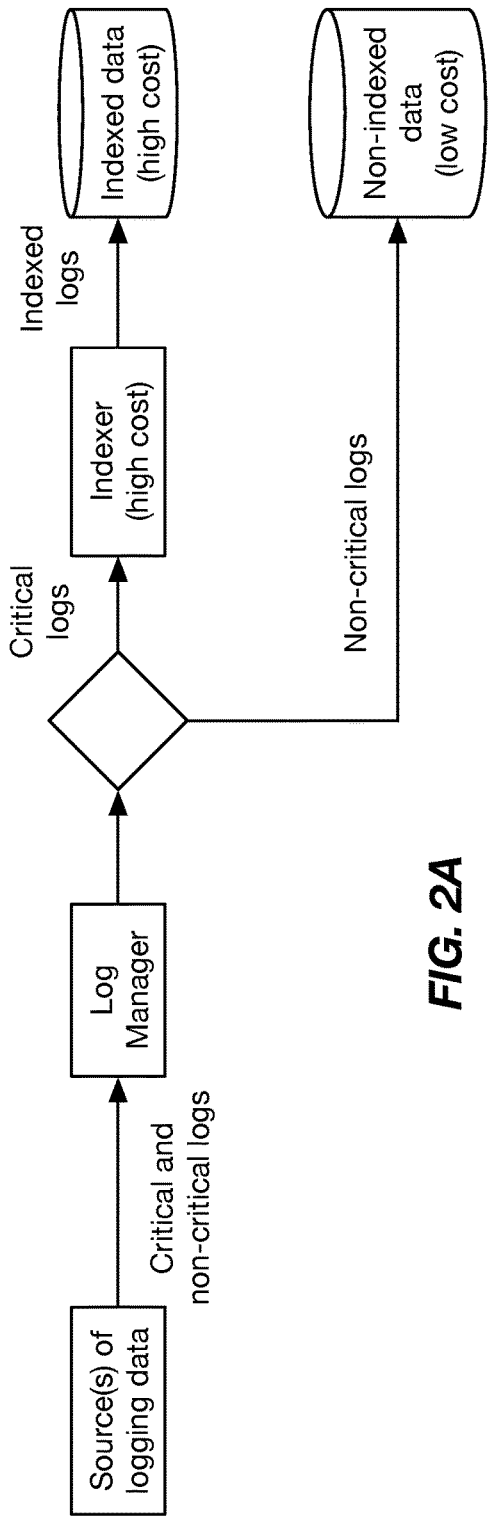
FIG. 2A is a block diagram illustrating processing flow in an implementation of cloud-based management.

For example, referring first to FIG. 2A, illustrated is a block diagram illustrating processing flow in an implementation of cloud-based management. As shown, logging data may be gathered from various sources, including local and remote devices. For example, logging data may be gathered from local storage of a device, such as a desktop computer, server, laptop computer, appliance, or other such device, as well as from storage of remote devices. In an implementation of the latter, an appliance, such as a network appliance, gateway, router, network accelerator, or similar device, may gather logging data from devices connected to a local area network for transfer to a cloud-based log aggregator. This may allow collection and analysis of such latter devices without requiring them to be able to communicate with the cloud-based log aggregator (or other devices on a wide area network), enhancing security by reducing the number of "trusted" external connections required.

The log manager may sort or classify the logs into critical and non-critical logs. In some implementations, the logs may include explicit identifiers generated during creation of the logs, while in other implementations, the log manager may determine whether each log should be classified as critical or non-critical based on one or more characteristics of the logs, including the source, log type, creation time or date, application or routine that generated the log, data within the log (e.g. warning codes or error codes, etc.), or any other such characteristics.

Critical logs may be provided to an indexer of the log aggregator for processing and analysis. Indexing the logs may include parsing the logs, identifying correlations between different logs (e.g. times, error codes, devices types, corresponding applications, etc.), or other such functions, and may be used to analyze errors or other events. Indexing may require significant processing resources by the log aggregator, particularly with large logs or large numbers of logs. For example, in many implementations, a single device may generate dozens or hundreds of logs from various processes, including operating system processes, network processes, disk access processes, applications, etc., and an enterprise may include hundreds or thousands of devices. The resulting plurality of logs may require significant time and resources to analyze.

Figure 2B:
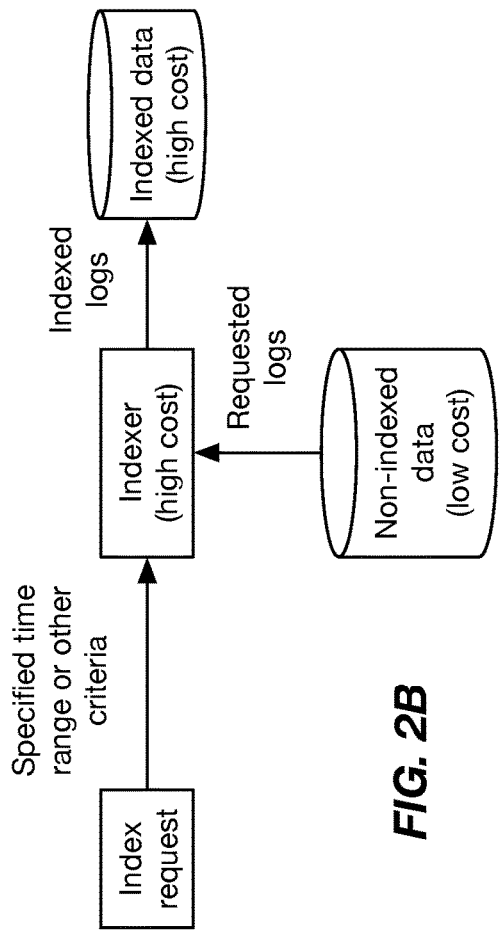
FIG. 2B is a block diagram illustrating processing flow for on-demand indexing in an implementation of cloud-based management.

To reduce these processing costs and associated latency and delays, logs identified or classified by the log manager as non-critical may instead be provided to the log aggregator for storage or archival without indexing. Such logs may not be available for direct analysis and processing. However, because the non-critical logs are already provided to and stored by the log aggregator, the logs may be indexed dynamically or on demand in response to requests to analyze the non-critical logs. FIG. 2B is a block diagram illustrating processing flow for on-demand indexing in an implementation of cloud-based management. Upon receipt of an indexing request identifying a log, time range during which logs were generated, device or application that generated logs, or combinations of these or other criteria, the log aggregator may retrieve the corresponding log or logs from archival storage and index the logs, adding the resulting indexed logs to the indexed data. For example, an administrator responding to an emergency event or failure may narrow the cause to a time window, and may request indexing and analysis of logs from that time window. This allows for full analysis of events, without requiring a priori indexing of all logs. Providing the non-critical logs for archival and later indexing and analysis also avoids delays that may be associated with transmitting the non-critical logs to the log aggregator when an emergency event occurs, as well as providing off-site backup storage of the log data, unlike implementations in which non-critical logs are maintained at the individual devices, which may result in loss of data in an emergency.

Figure 3A:
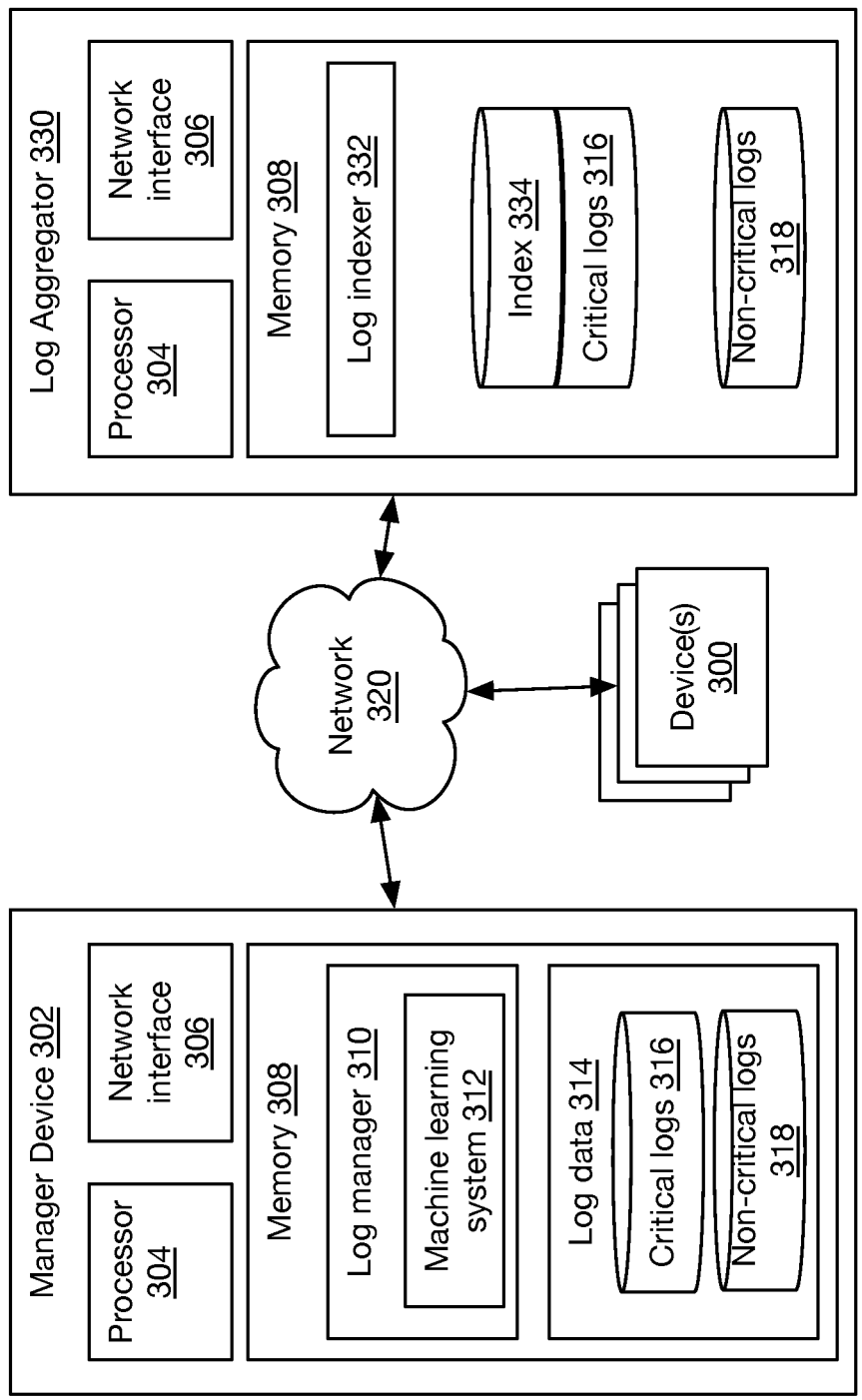
FIG. 3A is a block diagram illustrating an implementation of a network environment for use with cloud-based log management.

FIG. 3A is a block diagram illustrating an implementation of a network environment for use with cloud-based log management. A manager device 302, which may sometimes be referred to as a log manager device, management device, log maintenance device, log collector device, log aggregator device (distinct from a log analyzer 330, which may sometimes also be referred to as a log aggregator), or by other such terms, may comprise an appliance, desktop computer, laptop computer, server, workstation, network device such as a gateway, router, accelerator, or other such network device, or any other type and form of computing device. The manager device 302 may, in some implementations, communicate via a network 320 to one or more other devices 300 to collect logs from the devices 300, and may provide the logs to a log aggregator 330. Manager device 302 may comprise any type and form of computing device, such as a device 101 discussed above, and may comprise a processor 304 (which may include or be similar to a processor 103 discussed above), a network interface (such as a communications interface 118 discussed above), and memory 308 (such as non-volatile memory 128).

Manager device 302 may execute a log manager 310, which may comprise an application, service, server, daemon, routine, or other executable logic for collecting or retrieving log data 314, including event logs, access logs, process logs, network logs, or any other type of audit record, locally from manager device 302 and/or from devices 300 via a network 320. In some implementations, log manager 310 may classify log data 314 as critical log data 316 or non-critical log data 318. In other implementations, log manager 310 may classify log data 314 according to a plurality of priority or "critical" levels, including high priority or critical, moderate priority, low priority or non-critical, etc. In such implementations, critical data or high priority data may be indexed fully; moderate data may be partially indexed or left un-indexed and stored in a quick access storage medium (e.g. online drive); low priority or non-critical data may be left un-indexed and also be highly compressed or stored on a high density storage medium (e.g. tape drive or offline drive, which may have slower access than a storage medium storing moderate data), etc. Logs may be identified as critical logs 316 or non-critical logs 318 (or other priority levels) via metadata or header data appended to each log, an identifier appended to a group of logs (e.g. metadata to a compressed archive of a plurality of logs), or by any other such means. For example, in some implementations, an identifier, which may be referred to as an indexing control identifier, priority identifier, criticality identifier, or by other such terms, may be appended or added to a header or metadata of a log. The identifier may be in any type and format, such as an XML tag, predetermined bit in an options field, or by any other such method. In some implementations, the logs may not be modified themselves, but may be transmitted as packets with an identifier added to a header of the packets (e.g. in an application layer header, options field of a transport layer header, etc.).

Devices 300 may comprise any type and form of computing devices that generate logs or audit records, including desktop computers, laptop computers, tablet computers, wearable computers, smart phones, consoles, smart or IoT devices, servers, workstations, appliances, or any other type and form of computing device, including a device 101 as discussed above. Devices 300 may communicate with manager device 302 via a network 302, which may comprise a local area network, medium or metropolitan area network, wide area network such as the Internet, cellular network, satellite network, broadband or cable network, 802.11 or WiFi network, Bluetooth network, peer-to-peer or ad hoc network, or any combination of these or other networks. Such communications may be via one or more intermediary devices (not illustrated). Although shown connected to network 320 in parallel with manager device 302 and log aggregator 330, in many implementations, devices 300 may be connected to a second network 320 (not illustrated) connected to manager device 302, with manager device 302 deployed as an intermediary between devices 300 and log aggregator 330. Devices 300 may generate logs according to operating system processes, network processes, disk access processes, applications or other services, or any other functions, and may transmit the logs to manager device 302, either on request, periodically, or responsive to another trigger (e.g. startup, shutdown, activation of a process or application, connection or disconnection of a disk, etc.). In some implementations, devices 300 may provide logs directly to a log aggregator 330 without traversing manager device 302. In such implementations, devices 300 may classify logs as critical logs 316 or non-critical logs 318 or by other such identifiers prior to transmission of the logs to log aggregator 330.

Log aggregator 330 may comprise a server, server cloud or farm including one or more virtual machines executed by one or more physical machines, cluster, workstation, appliance, or other computing device or computing devices. Log aggregator 330 may sometimes be referred to as a log analyzer, log indexer, data processor, or by other such terms. In many implementations, logs may be collected and aggregated at manager device 302, and accordingly, log aggregator 330 may be referred to as a log indexer or analyzer.

Log aggregator 330 may similar comprise one or more processors 304, network interfaces 306, and memory devices 308. Log aggregator 330 may execute a log indexer 332 for parsing and indexing critical logs 316, as well as any non-critical logs 318 requested for on-demand indexing as discussed above. Index 334 may comprise a database, array, flat file, or other data structure for storing data about each log in an easily queried format, such as a SQL data file, and may comprise data such as error types, times, related devices or applications, or any other such data. As discussed above, generating the index 334 for critical logs 316 may be highly expensive in terms of processor and memory resources, particularly with large numbers of logs from large numbers of devices.

Figure 3B:
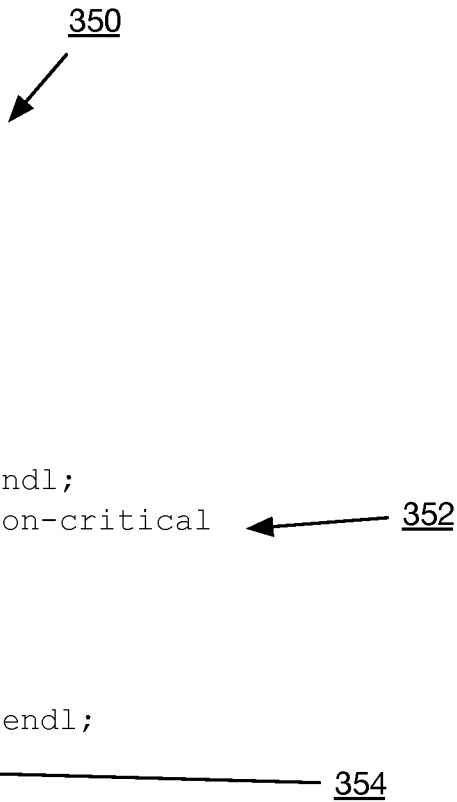
FIG. 3B is an example of source code of an implementation of log management utilizing explicit classification tagging.

In some implementations, logs may be explicitly classified as critical logs 316 or non-critical logs 318 during generation of the logs. For example, referring briefly to FIG. 3B, illustrated is an example of source code 350 of an implementation of log management utilizing explicit classification tagging. The example illustrated is simply for descriptive purposes, and the illustrated techniques may be used in any type and form of application, function, routine, or other logic, in any programming language. As shown, in some implementations, function calls may be added to processes for generating and/or tagging generated logs with priority levels, such as low priority or non-critical tags 352 and high priority or critical tags 354. The corresponding functions may generate new logs, in some implementations, or may add identifiers to already generated logs (e.g. logs generated during execution of the program) to indicate whether the corresponding log should be classified as critical or non-critical (or any other priority level). Accordingly, program developers may determine that events that occur during execution may be more or less important, and explicitly identify logs for indexing or archival without indexing.

In another implementation, logs may be classified based on policies set by an administrator or user of the system, without requiring changes to the programs generating the log or efforts by developers; instead, a log manager may tag logs as critical or non-critical (or any other priority level) based on matching characteristics, such as device identifiers or types (e.g. device 1234, or "smartphones"), user or group identifiers (e.g. "Bob" or "Accounting"), locations (either physical or logical, such as at a data center or remote office), applications or processes (e.g. "Email" or "operating system"), times of day (e.g. during a work period), or any other such characteristics.

Figure 3C:
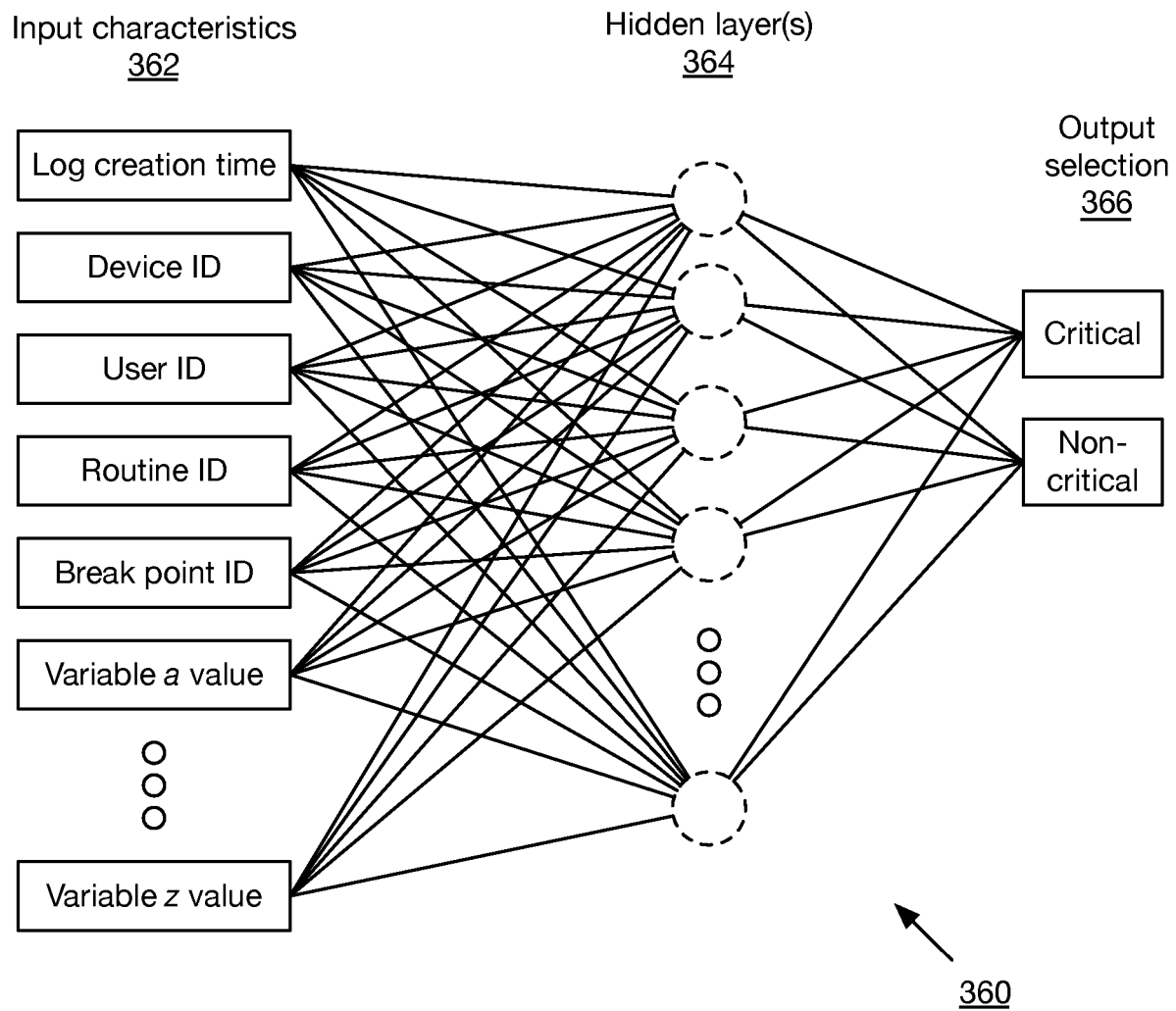
FIG. 3C is a block diagram of an implementation of a neural network for automatic classification tagging for log management.

In a similar implementation, and referring briefly back to FIG. 3A, logs may be classified based on selections by a machine learning system 312 of log manager 310. Machine learning system 312 may comprise any type and form of machine learning, such as a neural network, probabilistic classifier, or other such system. In some implementations, machine learning system 312 may be trained based on logs that have been retrieved in response to queries of a log aggregator or analyzer. For example, if an administrator repeatedly queries an analyzer for logs relating to a WiFi access point, the machine learning system may select other logs of the WiFi access point to be classified as critical and indexed for future queries. FIG. 3C is a block diagram of one such implementation of a neural network 360 for automatic classification tagging for log management. A variety of input characteristics 362 may be used for analysis, which may be automatically extracted or parsed from the logs or header or metadata of the logs by the machine learning system, including creation times, device identifiers, user identifiers, routine or processor identifiers, break point identifiers or locations within executable code of a process, values of various variables used or generated by the process, or any other such information. Via weights applied to a plurality of nodes of one or more hidden layers 364, the machine learning system may generate a classification score 366 for critical or non-critical classification (or any other priority level). In some implementations, a classification with a highest score may be applied to the log. In a further implementation, if no classification score exceeds a threshold, the log may be set to a default classification (either critical or non-critical or any other level, according to an administrator's selection to balance costs and availability of indexed logs), or flagged for further review. In addition to being trained on previously queried logs, as the log analyzer is utilized and additional non-critical logs are queried and indexed (e.g. changing a log from non-critical to critical), the node weights may be adjusted in order to increase accuracy of future selections.

Figure 4:
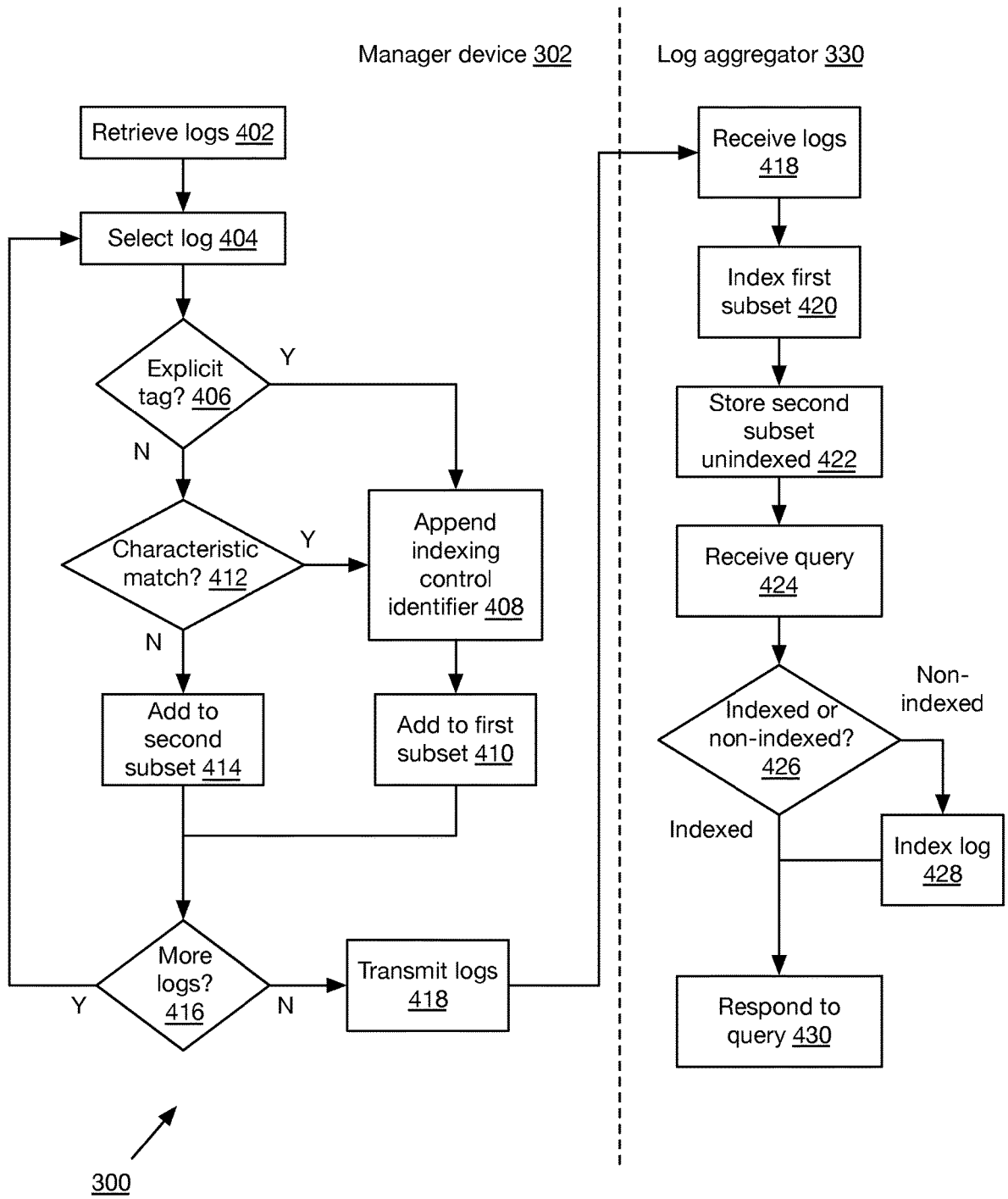
FIG. 4 is a flow chart illustrating an implementation of a method for log management.

FIG. 4 is a flow chart illustrating an implementation of a method 300 for log management. At step 402, a device may retrieve one or more logs. The logs may be retrieved from other devices, with the first device acting as a manager device 302, or may be retrieved from memory of the device itself, such as in implementations in which each device provides logs to the log aggregator 330. The logs may be retrieved upon generation, periodically, on request, or on any other such schedule.

The device may select a first subset of logs for classification as critical. For example, in some implementations, at step 404, a first log may be selected from the retrieved logs, and a log manager of the device may determine whether the log includes an explicit classification tag at step 406. As discussed above, in some implementations, logs may be explicitly identified for priority or criticality via function calls or instructions set by a developer of an application or process. If the logs are explicitly identified as critical or high priority, then at step 408, the log manager may append an identifier or classifier to the log or a header or metadata of the log, such as an indexing control identifier. As discussed above, the identifier may comprise XML tags, metadata tags, predetermined bits in an option field, or any other such identifier. At step 410, the log may be added to the first subset of logs for indexing by the log aggregator.

If the log is not explicitly identified or tagged, then at step 412, the log manager may determine whether characteristics of the log correspond to a classification according to a policy or machine learning system. As discussed above, policies may be set by an administrator to classify logs according to one or more characteristics, such as device type or identifier, user or group identifier, associated process or application, etc.; or may be determined via a machine learning system trained on previously accessed or queried logs. If the log matches a critical classification policy or has a high score for critical classification (exceeding a threshold or exceeding other scores, depending on implementation), the log manager may append an indexing control identifier to the log at step 408, and add the log to the first subset for indexing at step 410.

If the log does not match the policy or a critical classification score does not exceed a threshold or other scores, then at step 414, the log may be added to a second subset for archival without indexing. In some implementations, a non-indexing identifier or similar identifier may be added or appended to the log (similar to step 408), while in other implementations, the log may be left unmodified or untagged.

At step 416, the log manager may determine if additional logs are to be classified. If so, steps 404-416 may be repeated iteratively for each additional log. Once all logs have been classified, at step 418, the first subset and second subset of logs may be transmitted to the log aggregator. In some implementations, the first subset of logs (e.g. high priority or critical logs) may be transmitted first, to allow indexing to start while the remaining logs are being transmitted. This may reduce the time until the logs are ready for analysis, particularly if the number or size of the logs in the second, non-indexed subset is very large.

At step 418, the log aggregator may receive the logs from the manager device and/or from other devices. As discussed above, the logs may be provided in order or priority, or may be provided together. At step 420, the log aggregator may index the first subset of critical or high priority logs. Indexing the logs may comprise extracting or parsing data in a header, payload, or metadata of a log, such as creation times or event times; associated processes, devices, users, or other identifiers; variable values; or any other type and form of information. In some implementations, indexing the log may comprise extracting information about related processes or conditions from the log, including network characteristics (e.g. connectivity, latency, bandwidth, DNS settings, etc.), device characteristics (e.g. temperature, processor utilization, memory utilization, location, etc.), or any other such information. The extracted or parsed data may be added to a data structure to allow easy queries, such as a relational database, array, or other type and format of data.

At step 422, the log aggregator may store lower priority or non-critical log data without indexing. In some implementations, storing the lower priority log data may comprise compressing the logs, storing the logs on another storage device (e.g. offline storage or high density or lower access speed storage, etc.).

As discussed above, in some implementations, non-indexed data may be requested for indexing. At step 424, in some implementations, the log aggregator may receive a query to analyze log data. At step 426, the log aggregator may determine if the query corresponds to indexed logs or non-indexed logs. The query may comprise a time frame, device type or identifier, or any other such information. Determining if the query corresponds to indexed or non-indexed logs may comprise searching the indexed data for corresponding entries, in some implementations, and proceeding to non-indexed logs if the query does not find any entries; while in other implementations, the query may explicitly identify one or more logs, and the log aggregator may determine whether the logs are in the first subset or second subset based on file names, storage locations, or other such identifiers.

If the query corresponds to indexed data, then at step 430, the log aggregator may respond with the requested data. If the query corresponds to non-indexed logs, then at step 428, the log aggregator may index the corresponding logs (similar to step 420). An indexing control identifier may be added to the corresponding logs (similar to step 408) in some implementations. The corresponding logs may be moved from archival storage and added to live or online storage, in some implementations. Once indexed, the log aggregator may process the query and respond with the requested data at step 430.

Accordingly, critical data may be indexed and ready for queries, while lower priority or non-critical data may be archived without indexing, reducing processor utilization and cost at the log aggregator. In the event that non-critical data is required for troubleshooting or analysis, the non-critical data may be indexed dynamically on request. Because the non-critical data is stored at the cloud-based log aggregation system, it may be quickly indexed and added to the critical data, without additional consumption of bandwidth or delays due to transmission. Dynamic selection and classification of critical and non-critical data may thus allow an enterprise to balance costs and availability of indexed data.

In should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and that these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code languages such as JAVA. The software programs or executable instructions may be stored on or in one or more articles of manufacture as object code.

While the foregoing writing description of the methods and systems enable one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufactured using programmable and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMS, ROMs, PROMs, RAMs, SRAMs, etc.), hardware (e.g., integrated circuit chip, Field Programmable Gate Array (FPGA), Application Specified Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The articles of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described method and systems. Thus, the scope of the methods and systems described herein should not be limited by any of the illustrative embodiments and should be defined in accordance with the accompanying claims and their equivalents.

What is claimed is:

1. A method for cloud-based log management, comprising:
   retrieving, by a log manager of a computing device, a plurality of logs;
   selecting, by the log manager, a first subset of the plurality of logs responsive to each of the logs of the first subset lacking an identifier of whether each of the logs should be indexed or not;
   classifying, by the log manager, a first portion of the first subset of the plurality of logs as to be indexed and a second portion of the first subset of the plurality of logs as not to be indexed, responsive to characteristics of logs previously requested for review being respectively similar to the first portion and not similar to the second portion;
   transmitting, by the log manager to a log aggregator, the first portion of the first subset of the plurality of logs, responsive to the classification of the first subset of the plurality of logs as to be indexed; and
   transmitting, by the log manager to a storage device of the log aggregator, the second portion of the first subset of the plurality of logs.

2. The method of claim 1, wherein retrieving the plurality of logs further comprises retrieving, by the log manager from a plurality of additional computing devices, the plurality of logs.

3. The method of claim 1, wherein classifying the first subset of the plurality of logs as to be indexed further comprises appending, by the log manager, an indexing control identifier to each log of the first subset of the plurality of logs.

4. The method of claim 1, wherein classifying the first subset of the plurality of logs as to be indexed further comprises further comprises classifying the first subset of the plurality of logs as critical or high priority.

5. The method of claim 1, wherein the log aggregator stores the second portion of the first subset of the plurality of logs without indexing responsive to the second portion of the first subset of the plurality of logs not being classified as to be indexed.

6. The method of claim 1, wherein selecting the first subset of the plurality of logs further comprises:
   selecting a log of the plurality of logs, by a machine learning system of the computing device; and
   adding the log to the first subset, by the machine learning system, responsive to the log having characteristics matching characteristics of logs previously requested for review.

7. The method of claim 6, wherein the characteristics comprise routines that generated the logs previously requested for review, computing devices corresponding to the logs previously requested for review, generation times of logs previously requested for review, or types of logs previously requested for review.

8. The method of claim 1, wherein selecting the first subset of the plurality of logs further comprises:
   for each log of the first subset of the plurality of logs:
      identifying, by the log manager, a routine that generated the log, the routine comprising an indexing command, and
      adding the log to the first subset, by the log manager, responsive to the identified routine comprising the indexing command.

9. The method of claim 1, further comprising transmitting, by the log manager to the log aggregator, a request to index at least one log of the second portion of the first subset of the plurality of logs, the log aggregator indexing the at least one log of the second portion of the first subset of the plurality of logs responsive to receipt of the request.

10. A system for cloud-based log management, comprising:
    a computing device comprising a network interface and a processor executing a log manager;
    wherein the log manager is configured to:
       retrieve a plurality of logs,
       select a first subset of the plurality of logs responsive to each of the logs of the first subset lacking an identifier of whether each of the logs should be indexed or not,
       classify a first portion of the first subset of the plurality of logs as to be indexed and a second portion of the first subset of the plurality of logs as not to be indexed, responsive to characteristics of logs previously requested for review being respectively similar to the first portion and not similar to the second portion,
       transmit, to a log aggregator for indexing, the first portion of the first subset of the plurality of logs, responsive to the classification of the first subset of the plurality of logs as to be indexed, and
       transmit, to a storage device of the log aggregator, the second portion of the first subset of the plurality of logs.

11. The system of claim 10, wherein the log manager is further configured to retrieve, from a plurality of additional computing devices, the plurality of logs.

12. The system of claim 10, wherein the log manager is further configured to append an indexing control identifier to each log of the first subset of the plurality of logs.

13. The system of claim 12, wherein the log manager is further configured to identify each log of the first subset of the plurality of logs as critical or high priority.

14. The system of claim 10, wherein the log aggregator stores the second portion of the first subset of the plurality of logs without indexing responsive to the second portion of the first subset of the plurality of logs not being classified as to be indexed.

15. The system of claim 10, wherein the log manager further comprises a machine learning system configured to:

select a log of the plurality of logs; and add the log to the first subset, responsive to the log having characteristics matching characteristics of logs previously requested for review.

16. The system of claim 15, wherein the characteristics comprise routines that generated the logs previously requested for review, computing devices corresponding to the logs previously requested for review, generation times of logs previously requested for review, or types of logs previously requested for review.

17. The system of claim 10, wherein the log manager is further configured to:

for each log of the first subset of the plurality of logs:
identify a routine that generated the log, the routine comprising an indexing command, and
add the log to the first subset, by the log manager, responsive to the identified routine comprising the indexing command.

18. The system of claim 10, wherein the log manager is further configured to transmit, to the log aggregator, a request to index at least one log of the second portion of the first subset of the plurality of logs, the log aggregator indexing the at least one log of the second portion of the first subset of the plurality of logs responsive to receipt of the request.

19. A tangible computer-readable storage medium comprising instructions that, when executed by a processor of a computing device, cause the processor to:

retrieve a plurality of logs;

select a first subset of the plurality of logs responsive to each of the logs of the first subset lacking an identifier of whether each of the logs should be indexed or not;

classify a first portion of the first subset of the plurality of logs as to be indexed and a second portion of the first subset of the plurality of logs as not to be indexed, responsive to characteristics of logs previously requested for review being respectively similar to the first portion and not similar to the second portion;

transmit, to a log aggregator for indexing, the first subset of the plurality of logs; responsive to the classification of the first subset of the plurality of logs as to be indexed; and transmit, to a storage device of the log aggregator, the second portion of the first subset of the plurality of logs.

20. The computer-readable storage medium of claim 19, further comprising instructions to append an indexing control identifier to each log of the first subset of the plurality of logs.

* * * * *